United States Patent
Lee et al.

(10) Patent No.: US 11,431,499 B2
(45) Date of Patent: Aug. 30, 2022

(54) FINITE-FIELD DIVISION OPERATOR, ELLIPTIC CURVE CRYPTOSYSTEM HAVING FINITE-FIELD DIVISION OPERATOR AND METHOD FOR OPERATING ELLIPTIC CURVE CRYPTOSYSTEM

(71) Applicant: ELECTRONICS AND TELECOMMUNICATIONS RESEARCH INSTITUTE, Daejeon (KR)

(72) Inventors: Sang-Woo Lee, Daejeon (KR); Hyeok-Chan Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 16/717,028

(22) Filed: Dec. 17, 2019

(65) Prior Publication Data

US 2020/0274710 A1  Aug. 27, 2020

(30) Foreign Application Priority Data

Feb. 21, 2019 (KR) .......................... 10-2019-0020329

(51) Int. Cl.
*H04L 9/30* (2006.01)
*G06F 7/72* (2006.01)

(52) U.S. Cl.
CPC ............ *H04L 9/3066* (2013.01); *G06F 7/725* (2013.01); *G06F 7/726* (2013.01); *H04L 2209/122* (2013.01)

(58) Field of Classification Search
CPC ............ H04L 9/3066; H04L 2209/122; G06F 7/725; G06F 7/726

(Continued)

(56) References Cited

U.S. PATENT DOCUMENTS 6,782,100 B1 * 8/2004 Vanstone .............. H04L 9/3252
                                                    380/278
7,676,037 B2  3/2010 Jung et al.
(Continued)

FOREIGN PATENT DOCUMENTS

KR       2003-0003435 A       1/2003
KR    10-2004-0053833 A       6/2004
(Continued)

OTHER PUBLICATIONS

Aboshosha et al., "Lightweight Cryptographic Alogrithm: Variable Key Length Encryption Algorithm (VEA)", IEEE, doi: 10.1109/ICCTA35431.2014.9521620, Oct. 2014, pp. 8-13. (Year: 2014).*

(Continued)

*Primary Examiner* — Peter C Shaw
(74) *Attorney, Agent, or Firm* — NSIP Law

(57) ABSTRACT

Disclosed herein are a finite-field division operator, an elliptic curve cryptosystem having the finite-field division operator, and a method for operating the elliptic curve cryptosystem. The method for operating an elliptic curve cryptosystem may include, setting, by a key setting unit, a length of a key of a cryptographic algorithm, generating, by the key setting unit, first setup information that indicates a number of words corresponding to the key length, and generating, by the key setting unit, second setup information that indicates a number of repetitions of an operation by a finite-field division operator corresponding to the key length.

13 Claims, 5 Drawing Sheets

(58) Field of Classification Search
USPC .......................................................... 380/30
See application file for complete search history.

(56) References Cited

U.S. PATENT DOCUMENTS

| | | | |
|---|---|---|---|
| 7,848,513 B2 | 12/2010 | Yun et al. | |
| 8,396,213 B2 | 3/2013 | Brown et al. | |
| 9,065,631 B2 | 6/2015 | Chang et al. | |
| 2002/0044649 A1* | 4/2002 | Gallant | G06F 7/725 708/492 |
| 2008/0130873 A1* | 6/2008 | Bolotov | H04L 9/3066 380/28 |
| 2009/0097639 A1* | 4/2009 | Hotta | G09C 1/00 380/29 |
| 2009/0103726 A1* | 4/2009 | Ahmed | H04L 9/12 380/46 |
| 2010/0177901 A1* | 7/2010 | Bates | G06F 21/80 380/278 |
| 2011/0085663 A1* | 4/2011 | Rozek | H04L 63/0428 380/255 |
| 2018/0089467 A1* | 3/2018 | Pedersen | H04L 9/0631 |
| 2019/0036678 A1* | 1/2019 | Ahmed | H04L 9/0631 |
| 2021/0320796 A1* | 10/2021 | Koziel | H04L 9/3073 |

FOREIGN PATENT DOCUMENTS

| | | |
|---|---|---|
| KR | 10-0530372 B1 | 11/2005 |
| KR | 10-2018-0120519 A | 11/2018 |

OTHER PUBLICATIONS

Alhag et al., "An Enhancement to Data Encryption Standards Algorithm (DES)", IEEE, 978-1-5386-4123-1/18/$31.00, 2018, pp. 1-6. (Year: 2018).*
Khalil-Hani et al., "A tightly coupled finite field arithmetic hardware in an FPGA-based embedded processor core for elliptic curve cryptography", IEEE, doi: 10.1109/ICED.2008.4786692, 2008, pp. 1-6. (Year: 2008).*
Jung, Michael, et al. "A reconfigurable coprocessor for finite field multiplication in GF (2n)", IEEE Workshop on Heterogenous reconfigurable SoC, 2002, pp. 1-6. (Year: 2002).*
Safieh et al., "Area Efficient Coprocessor for the Elliptic Curve Point Multiplication", IEEE, doi: 10.30420/454862032, 2019, pp. 1-6. (Year: 2019).*
Park, B. G. et al. "A Lightweight ECC Processor Supporting Elliptic Curves over NIST Prime Fields." Journal of The Institute of Electronics and Information Engineers 55.9 (2018): 1107-1115. (9 pages in Korean).
Sung, Byung-Yoon, et al. "A Public-key Cryptography Processor supporting P-224 ECC and 2048-bit RSA." Journal of IKEEE 22.3 (2018): 522-531. (10 pages in Korean).

\* cited by examiner

FINITE-FIELD DIVISION OPERATOR, ELLIPTIC CURVE CRYPTOSYSTEM HAVING FINITE-FIELD DIVISION OPERATOR AND METHOD FOR OPERATING ELLIPTIC CURVE CRYPTOSYSTEM

CROSS REFERENCE TO RELATED APPLICATION

This application claims the benefit of Korean Patent Application No. 10-2019-0020329, filed Feb. 21, 2019, which is hereby incorporated by reference in its entirety into this application.

BACKGROUND OF THE INVENTION

1. Technical Field

The present invention relates to a finite-field division operator, an elliptic curve cryptosystem having the finite-field division operator, and a method for operating the elliptic curve cryptosystem.

2. Description of the Related Art

Generally, a lot of research into an Elliptic Curve Cryptosystem (ECC) as a public key cryptosystem has been conducted since the elliptic curve cryptosystem was proposed by Neal Koblitz and Victor Miller in 1985. This cryptosystem is based on discrete logarithm problems pertaining to points on an elliptic curve, and is advantageous in that, in comparison with Rivest-Shamir-Adleman (RSA)/Digital Signature Algorithm (DSA), which is widely used as an existing public key cryptosystem, at the same security, the elliptic curve cryptosystem is faster than RSA/DSA and has a key smaller than that of RSA/DSA. For example, it is known that the security of the elliptic curve cryptosystem having a key size of about 160 bits is identical to that of RSA having a key size of 1024 bits. Therefore, the elliptic curve cryptosystem has attracted attention as a public key cryptosystem suitable for smart cards or the like having limited computing power and limited memory. Operations in such an elliptic curve cryptosystem are implemented as operations of points on an elliptic curve. The operations of points on an elliptic curve may be composed of finite-field operations such as finite-field addition, finite-field subtraction, finite-field multiplication, and finite-field division. Elliptic curve cryptography or the like is characterized in that cryptographic security thereof is determined according to the size of the key that is used. That is, with current cryptosystems, in the case of an elliptic curve, it is recommended to use 256 bits in order to guarantee security. However, with the advent of quantum computing, the need to increase the size of keys has arisen. As an example, in 2017 revised version of IEEE 1609.2, which is the international standard specification of vehicle communication security, use of 384-bit elliptic curve cryptography, besides existing 256-bit elliptic curve cryptography, was recommended. However, the existing elliptic curve cryptosystem implemented based on a 256-bit key is problematic in that the use of 384-bit elliptic curve cryptography is not supported. Further, among operations in elliptic curve cryptography, the operation which takes the longest time is a finite-field division (finite division) operation, and a fast finite-field division operation is essential for fast elliptic curve cryptography. The existing elliptic curve cryptosystem is problematic in that hardware must be replaced when the length of a key is changed.

PRIOR ART DOCUMENTS

Patent Documents (Patent Document 1) Korean Patent No. 10-0530372, Date of Publication: Jun. 23, 2005, Title: Cryptographic Method Capable of Protecting Elliptic Curve Code from Side Channel Attacks (Patent Document 2) U.S. Pat. No. 8,396,213, Date of Publication: Aug. 16, 2007, Title: Elliptic Curve Random Number Generation.

SUMMARY OF THE INVENTION

Accordingly, the present invention has been made keeping in mind the above problems occurring in the prior art, and an object of the present invention is to provide a finite-field division operator that is capable of variably changing the length (size) of a key, an elliptic curve cryptosystem having the finite-field division operator, and a method for operating the elliptic curve cryptosystem.

Another object of the present invention is to provide an elliptic curve cryptosystem for providing the structure of a new finite-field division operator and a method for operating the elliptic curve cryptosystem.

In accordance with an aspect of the present invention to accomplish the above objects, there is provided a method for operating an elliptic curve cryptosystem, including setting, by a key setting unit, a length of a key of a cryptographic algorithm; generating, by the key setting unit, first setup information that indicates a number of words corresponding to the key length; and generating, by the key setting unit, second setup information that indicates a number of repetitions of an operation by a finite-field division operator corresponding to the key length.

The first setup information may be transmitted to a first operation device including a coordinate system transformation unit, an elliptic curve point addition unit, and an elliptic curve scalar multiplication unit, and the second setup information is transmitted to the finite-field division operator.

The first operation device may be implemented using software.

The finite-field division operator may be implemented using hardware.

The finite-field division operator may include multiple registers, each configured to store an initial value and an intermediate calculation value; multiple adders/subtractors, each configured to perform finite-field addition or subtraction on output values of the multiple registers; multiple multiplexers, each configured to select any one of an output value of any one of the multiple registers and an output value of any one of the multiple adders/subtractors; multiple shifters configured to perform right shifting on output values of the multiple multiplexers and output right-shifted values, which are the intermediate calculation values, to corresponding registers; and a controller configured to control the multiple adders/subtractors, the multiple multiplexers, and the multiple shifters.

In accordance with another aspect of the present invention to accomplish the above objects, there is provided an elliptic curve cryptosystem, including at least one processor; a memory for storing at least one instruction that is executed by the at least one processor; and a finite-field division operator, wherein the at least one instruction is implemented such that a key setting unit sets a length of a key of a cryptographic algorithm, the key setting unit generates first setup information that indicates a number of words corresponding to the key length, and the key setting unit generates second setup information that indicates a number of repetitions of an operation by a finite-field division operator corresponding to the key length.

The at least one instruction may be further implemented such that a coordinate system transformation unit transforms elliptic curve points between an affine coordinate system, a projective coordinate system, and a Jacobian coordinate system so as to perform an elliptic curve cryptographic operation, an elliptic curve point addition unit performs an addition operation on points on two different elliptic curves, and an elliptic curve scalar multiplication unit performs scalar multiplication on an arbitrary point or a fixed point, and wherein the first setup information is transmitted to the coordinate system transformation unit, the elliptic curve point addition unit, and the elliptic curve scalar multiplication unit.

The finite-field division operator may include multiple registers, each configured to store an initial value and an intermediate calculation value; multiple adders/subtractors, each configured to perform finite-field addition or subtraction on output values of the multiple registers; multiple multiplexers, each configured to select any one of an output value of any one of the multiple registers and an output value of any one of the multiple adders/subtractors; multiple shifters configured to perform right shifting on output values of the multiple multiplexers and output right-shifted values, which are the intermediate calculation values, to corresponding registers; and a controller configured to control the multiple adders/subtractors, the multiple multiplexers, and the multiple shifters.

The finite-field division operator may further include first, second, third, fourth, and fifth registers; a first adder/subtractor configured to perform addition or subtraction on a value stored in the first register, a value stored in the second register, and a value stored in the fifth register; a second adder/subtractor configured to perform addition or subtraction on a value stored in the third register and a value stored in the fourth register; a first multiplexer configured to select any one of the value stored in the first register and an output value of the first adder/subtractor; a second multiplexer configured to select any one of the value stored in the second register and the output value of the first adder/subtractor; a third multiplexer configured to select any one of the value stored in the third register and an output value of the second adder/subtractor; a fourth multiplexer configured to select any one of the value stored in the fourth register and an output value of the second adder/subtractor; first to fourth shifters configured to perform right shifting on respective output values of the first to fourth multiplexers and output right-shifted values to the first to fourth registers, respectively; and a controller configured to control the first and second adder/subtractors, the first to fourth multiplexers, and the first to fourth shifters.

An initial value of the first register may be a dividend, an initial value of the second register may be '0', an initial value of the third register may be a divisor, an initial value of the fourth register is a modulus, and an initial value of the fifth register is the modulus.

A number of repetitions of an operation performed by each of the first to fifth registers may be determined based on the second setup information.

The controller may be configured to when the value stored in the third register is not equal to the value stored in the fourth register, determine whether a Least Significant Bit (LSB) of the value stored in the third register is '0', when the LSB of the value stored in the third register is '0', perform right shifting on the value stored in the third register, and determine whether an LSB of the value stored in the first register is '0', when the LSB of the value stored in the first register is '0', perform right shifting on the value stored in the first register, when the LSB of the value stored in the first register is not '0', perform an addition operation on the value stored in the first register and the value stored in the fifth register, and output a first addition result value, and perform right shifting on the first addition result value, and store a right-shifted first addition result value in the first register.

The controller may be configured to, when the LSB of the value stored in the third register is not '0', determine whether an LSB of the value stored in the fourth register is '0', when the LSB of the value stored in the fourth register is '0', perform right shifting on the value stored in the fourth register, and determine whether an LSB of the value stored in the second register is '0', when the LSB of the value stored in the second register is '0', perform right shifting on the value stored in the second register, and when the LSB of the value stored in the second register is not '0', perform an addition operation on the value stored in the second register and the value stored in the fifth register perform and output a second addition result value, perform right shifting on the second addition result value, and store a right-shifted second addition result value in the second register.

The controller may be configured to, when the LSB of the value stored in the fourth register is not '0', determine whether the value stored in the third register is greater than the value stored in the fourth register, when the value stored in the third register is greater than the value stored in the fourth register, subtract the value stored in the fourth register from the value stored in the third register and output a first subtraction result value, perform right shifting on the first subtraction result value, store a right-shifted first subtraction result value in the third register, and determine whether the value stored in the first register is equal to or greater than the value stored in the second register, when the value stored in the first register is equal to or greater than the value stored in the second register, set a value, obtained by subtracting the value stored in the second register from the value stored in the first register, as a first intermediate calculation value, when the value stored in the first register is less than the value stored in the second register, subtract the value stored in the second register from the value stored in the first register, set a value, obtained by adding the value stored in the fifth register to a subtraction result value, as the first intermediate calculation value, and determine whether an LSB of the first intermediate calculation value is '0', when the LSB of the first intermediate calculation value is '0', perform right shifting on the value stored in the first register, and when the LSB of the first intermediate calculation value is not '0', add the value stored in the fifth register to the first intermediate calculation value and output a third addition result value, and perform right shifting on the third addition result value, and store a right-shifted third addition result value in the first register.

The controller may be configured to, when the value stored in the third register is not greater than the value stored in the fourth register, subtract the value stored in the third register from the value stored in the fourth register and output a second subtraction result value, perform right shifting on the second subtraction result value, store a right-shifted second subtraction result value in the fourth register, and determine whether the value stored in the second register is equal to or greater than the value stored in the first register, when the value stored in the second register is equal to or greater than the value stored in the first register, set a value, obtained by subtracting the value stored in the first register from the value stored in the second register, as a second intermediate calculation value, when the value stored in the second register is less than the value stored in the first register, subtract the value stored in the first register from the value stored in the second register, set a value, obtained by adding the value stored in the fifth register to a subtraction result value, as the second intermediate calculation value, and determine whether an LSB of the second intermediate calculation value is '0', when the LSB of the second intermediate calculation value is '0', perform right shifting on the value stored in the second register, and when the LSB of the second intermediate calculation value is not '0', add the value stored in the fifth register to the second intermediate calculation value and output a fourth addition result value, perform right shifting on the fourth addition result value, and store a right-shifted fourth addition result value in the second register.

The controller may be configured to, when the value stored in the third register is equal to the value stored in the fourth register, terminate a finite-field division operation.

In accordance with a further aspect of the present invention to accomplish the above objects, there is provided a finite-field division operator in an elliptic curve cryptosystem, including first, second, third, fourth, and fifth registers; a first adder/subtractor configured to perform addition or subtraction on a value stored in the first register, a value stored in the second register, and a value stored in the fifth register; a second adder/subtractor configured to perform addition or subtraction on a value stored in the third register and a value stored in the fourth register; a first multiplexer configured to select any one of the value stored in the first register and an output value of the first adder/subtractor; a second multiplexer configured to select any one of the value stored in the second register and the output value of the first adder/subtractor; a third multiplexer configured to select any one of the value stored in the third register and an output value of the second adder/subtractor; a fourth multiplexer configured to select any one of the value stored in the fourth register and an output value of the second adder/subtractor; first to fourth shifters configured to perform right shifting on respective output values of the first to fourth multiplexers and output right-shifted values to the first to fourth registers, respectively; and a controller configured to control the first and second adder/subtractors, the first to fourth multiplexers, and the first to fourth shifters, wherein each of the first to fifth registers determines a number of repetitions of an operation depending on a size of the register corresponding to setup information.

An initial value of the first register may be a dividend, an initial value of the second register may be '0', an initial value of the third register may be a divisor, an initial value of the fourth register may be a modulus, and an initial value of the fifth register may be the modulus.

The setup information may vary depending on a length of a key of a cryptographic algorithm.

When the registers have a 128-bit size based on the setup information and the key length is 256 bits, the number of repetitions of the operation may be 2.

BRIEF DESCRIPTION OF THE DRAWINGS

The accompanying drawings are provided to aid in understanding of the present embodiments, and the embodiments are provided together with the detailed descriptions thereof. However, the technical features of the present embodiments are not limited to what is specifically shown in the drawings, and the features disclosed in respective drawings may be combined to configure new embodiments.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various components, these components should not be limited by these terms. These terms are only used to distinguish one component from another component. For instance, a first component discussed below could be termed a second component without departing from the teachings of the present invention. Similarly, a second component could also be termed a first component. It will be understood that when a component is referred to as being "coupled" or "connected" to another component, it can be directly coupled or connected to the other component, or intervening components may be present therebetween. In contrast, it should be understood that when a component is referred to as being "directly coupled" or "directly connected" to another component, there are no intervening components present.

The terminology used herein is for the purpose of describing particular embodiments only and is not intended to be limiting. In the present invention, the singular forms are intended to include the plural forms as well, unless the context clearly indicates otherwise. It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Figure 1:
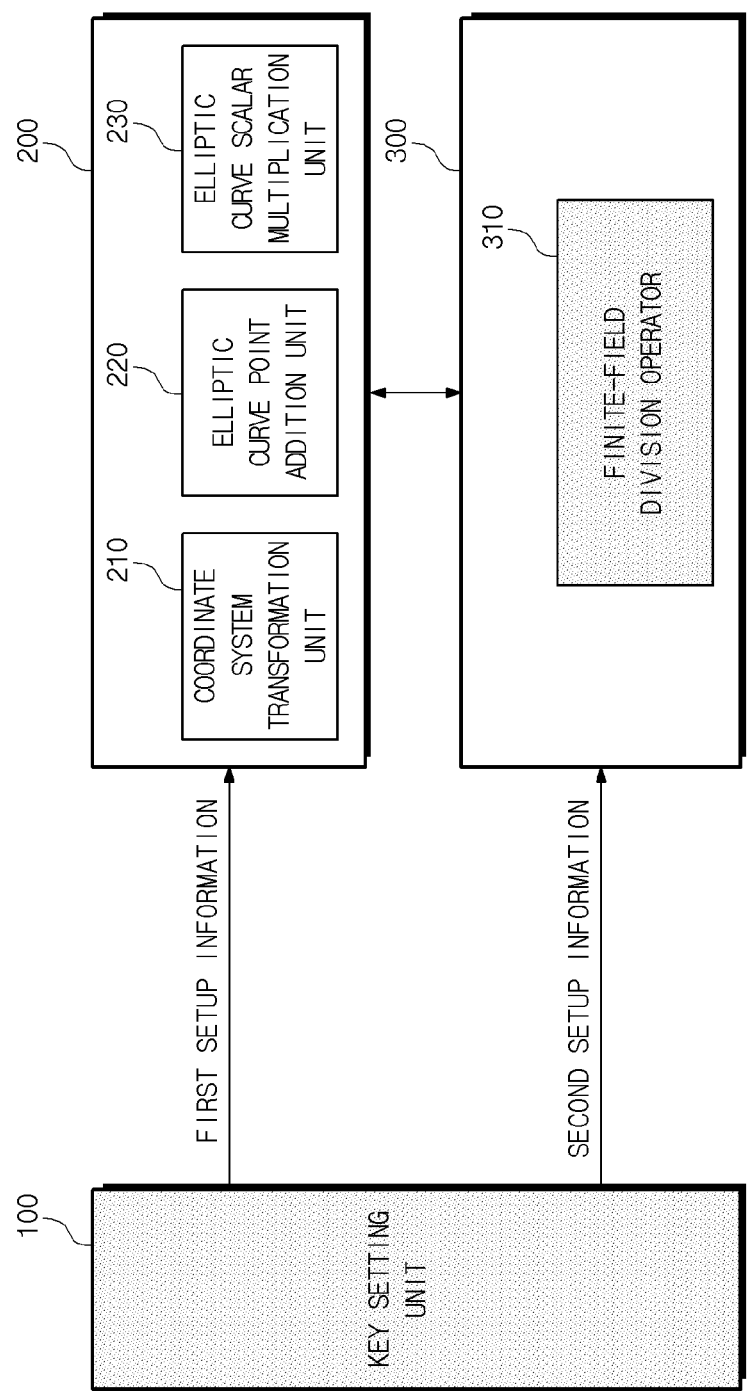
FIG. 1 is a diagram exemplarily illustrating an elliptic curve cryptosystem according to an embodiment of the present invention.

FIG. 1 is a diagram exemplarily illustrating an elliptic curve cryptosystem 10 according to an embodiment of the present invention. Referring to FIG. 1, the elliptic curve cryptosystem 10 may include a key setting unit 100, a first operation device 200, and a second operation device 300.

The key setting unit 100 may be implemented to set the parameters of the system depending on the key length of a cryptographic algorithm. For example, the key setting unit 100 may generate first setup information and second setup information depending on the key length of the cryptographic algorithm.

The first operation device 200 may include a coordinate system transformation unit 210, an elliptic curve point addition unit 220, and an elliptic curve scalar multiplication unit 230.

The coordinate system transformation unit 210 may transform elliptic curve points between an affine coordinate system, a projective coordinate system, and a Jacobian coordinate system when performing an elliptic curve cryptographic operation.

The elliptic curve point addition unit 220 may be configured to perform an addition operation on points on two different elliptic curves. For example, the following Equation (1) shows the calculation of an addition operation on two points (x1, y1) and (x2, y2) represented in an affine coordinate system.

$$x_3 = \lambda^2 - x_1 - x_2, y_3 = \lambda(x_1 - x_3) - y_1, \text{ where} \quad (1)$$

$$\lambda = \frac{y_2 - y_1}{x_2 - x_1} \text{ if } P_1 \neq P_2, \text{ and } \lambda = \frac{3x_1^2 - 3}{2y_1} \text{ if } P_1 = P_2.$$

Equation (1) may be performed differently for the case where the two points are identical to each other, that is, where a doubling operation on one point is performed, and for the case where the two points are different from each other.

The elliptic curve scalar multiplication unit 230 may be configured to perform scalar multiplication on an arbitrary point or a fixed point.

Meanwhile, the components of the first operation device 200 illustrated in FIG. 1, that is, the coordinate system transformation unit 210, the elliptic curve point addition unit 220, and the elliptic curve scalar multiplication unit 230, may be implemented using software. However, it should be understood that the present invention is not limited thereto. Each of the components 210, 220, and 230 of the first operation device 200 may be implemented using at least one of software, hardware, and firmware.

The second operation device 300 may include a finite-field division (finite division) operator 310.

The finite-field division operator 310 may be configured to perform a division operation on a prime field forming an elliptic curve. Meanwhile, the finite-field division operator 310 may be implemented using hardware. However, it should be understood that the present invention is not limited thereto.

The elliptic curve cryptosystem 10 according to an embodiment of the present invention has advantages in that a prime-field division operation requiring a lot of computation time is implemented using hardware, and operations on elliptic curve points are implemented using software, thus enabling elliptic curve cryptography computations to be performed at high speed.

Also, the elliptic curve cryptosystem 10 according to an embodiment of the present invention may update the length of an encryption key by controlling the first operation device 200 for elliptic curve points, implemented using software, through the key setting unit 100.

Figure 2:
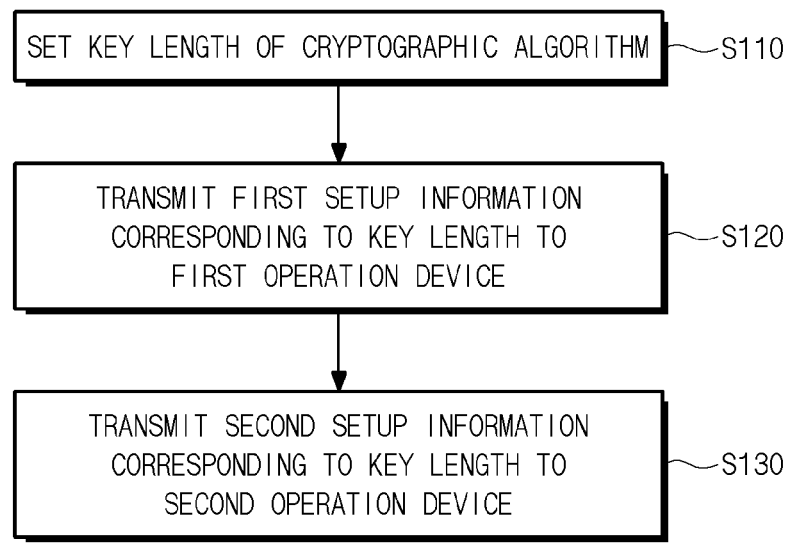
FIG. 2 is a flowchart exemplarily illustrating an initialization process performed by the elliptic curve cryptosystem according to an embodiment of the present invention.

FIG. 2 is a flowchart exemplarily illustrating an initialization process performed by the elliptic curve cryptosystem according to an embodiment of the present invention. Referring to FIGS. 1 and 2, the initialization process performed by the elliptic curve cryptosystem 10 may be performed as follows.

The length of a key of an elliptic curve cryptographic algorithm may be initially set by the key setting unit 110 at step S110.

By means of the set key length, the key setting unit 100 may transmit first setup information for the coordinate system transformation unit 210, the elliptic curve point addition unit 220, and the elliptic curve scalar multiplication unit 230, which are implemented using software, to the first operation device 200 at step S120. Here, the first setup information may contain the number of words determined depending on the length of encryption.

By means of the set key length, the key setting unit 100 may transmit second setup information for the finite-field division operator 310, which is implemented using hardware, to the second operation device 300 at step S130. Here, the second setup information may contain the number of repetitions of the corresponding operation depending on the size of a hardware register.

As described above, during an initialization operation, the setup information for the first and second operation devices 200 and 300 may be provided by the key setting unit 100 depending on the key length of the cryptographic algorithm.

Figure 3:
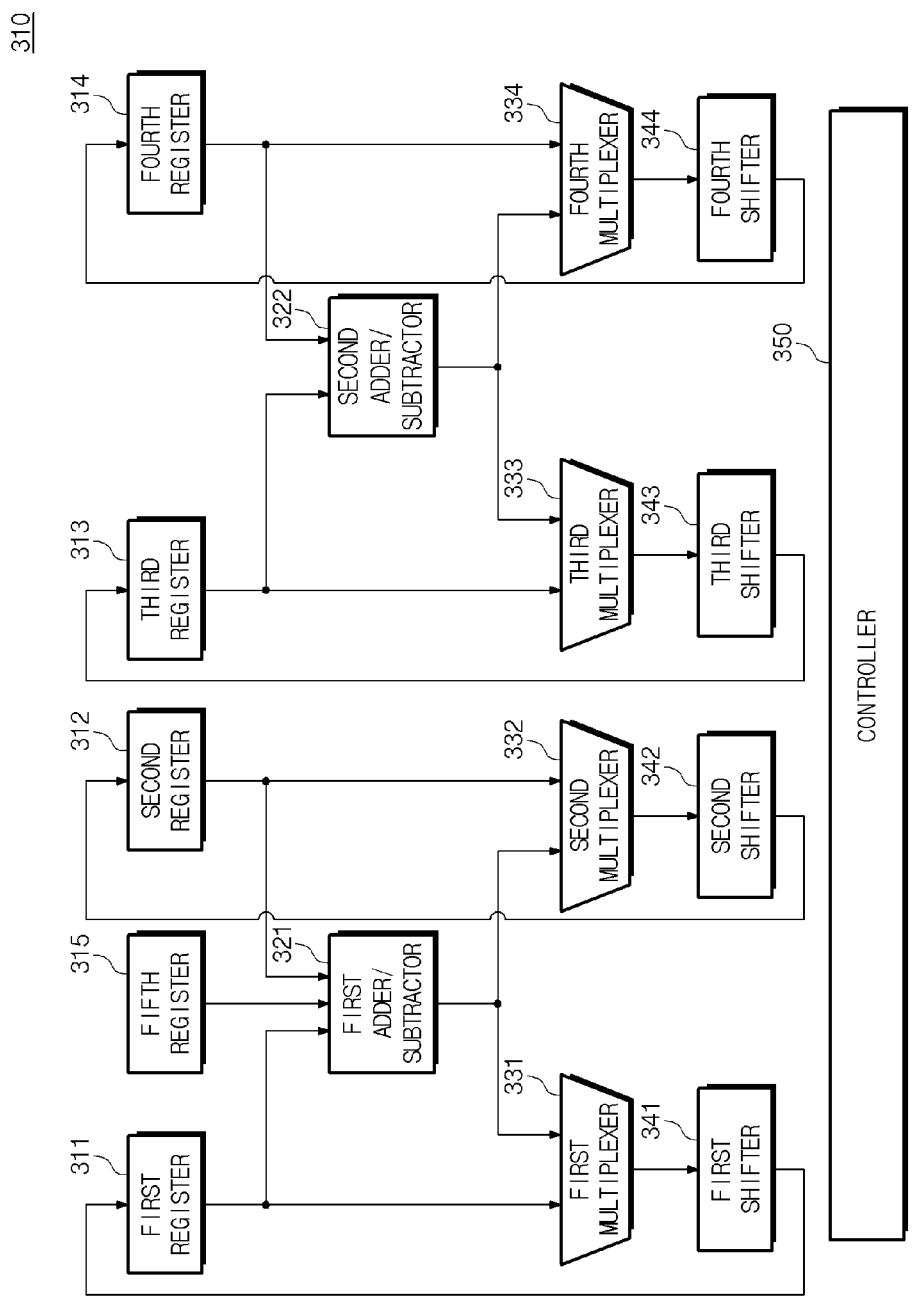
FIG. 3 is a diagram exemplarily illustrating a finite-field division operator according to an embodiment of the present invention.

FIG. 3 is a diagram exemplarily illustrating the finite-field division operator 310 according to an embodiment of the present invention. Referring to FIG. 3, the finite-field division operator 310 may include a first register 311, a second register 312, a third register 313, a fourth register 314, a fifth register 315, a first adder/subtractor 321, a second adder/subtractor 322, a first multiplexer 331, a second multiplexer 332, a third multiplexer 333, a fourth multiplexer 334, a first shifter 341, a second shifter 342, a third shifter 343, a fourth shifter 344, and a controller 350.

Each of the multiple registers 311 to 315 may be configured to store an initial value and an intermediate calculation value.

Each of the first and second adders/subtractors 321 and 322 may be configured to perform finite-field addition and finite-field subtraction.

Each of the multiple multiplexers 331 to 334 may be configured to select any one of the output value of the corresponding register and the output value of the corresponding adder/subtractor.

The multiple shifters 341 to 344 may be configured to perform right shifting.

The controller 350 may be configured to determine the inputs of the multiple adders/subtractors 321 and 322 and the multiple multiplexers 331, 332, 333, and 334.

Meanwhile, the initial set values of the registers are described below. The initial value of the first register 311 may be a dividend. The initial value of the second register 312 may be '0'. The initial value of the third register 313 may be a divisor. The initial value of the fourth register 314 may be a modulus. The initial value of the fifth register 315 may be a modulus.

The first adder/subtractor 321 may perform addition/subtraction operations on the output value of the first register 311, the output value of the fifth register 315, and the output value of the second register 312.

The second adder/subtractor 322 may perform addition/subtraction operations on the output value of the third register 313 and the output value of the fourth register 314.

The first multiplexer 331 may select any one of the output value of the first register 311 and the output value of the first adder/subtractor 321. The second multiplexer 332 may select any one of the output value of the second register 312 and the output value of the first adder/subtractor 321. The third multiplexer 333 may select any one of the output value of the third register 313 and the output value of the second adder/subtractor 322. The fourth multiplexer 334 may select any one of the output value of the fourth register 314 and the output value of the second adder/subtractor 322.

The first shifter 341 may perform right shifting on the output value of the first multiplexer 331. The second shifter 342 may perform right shifting on the output value of the second multiplexer 332. The third shifter 343 may perform right shifting on the output value of the third multiplexer 333. The fourth shifter 344 may perform right shifting on the output value of the fourth multiplexer 334.

Each of the multiple registers 311 to 315 may determine the number of repetitions of the corresponding operation depending on the size of the corresponding register based on the second setup information provided by the key setting unit 100. That is, when a 256-bit key is set, the finite-field division operator 310, which is initially configured using registers having a 128-bit size, may repeatedly perform the corresponding operation twice and then output the final results.

Figure 4:
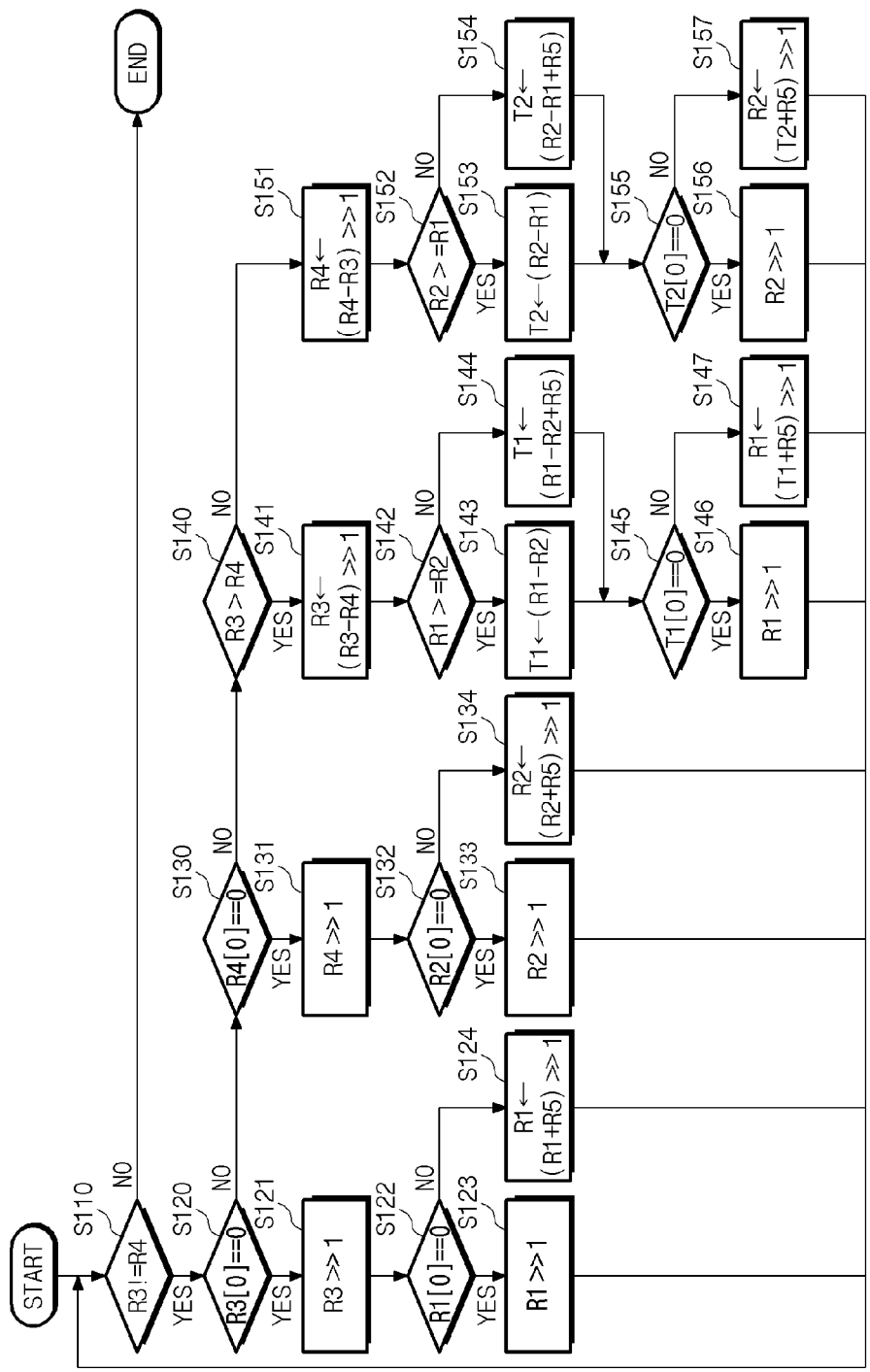
FIG. 4 is a diagram exemplarily illustrating an operation process performed by the finite-field division operator according to an embodiment of the present invention.

FIG. 4 is a diagram exemplarily illustrating an operation process performed by the finite-field division operator 310 according to an embodiment of the present invention. Referring to FIGS. 3 and 4, the operation process performed by the finite-field division operator 310 may be performed as follows.

In FIG. 4, R1 is a value stored in the first register 311, R2 is a value stored in the second register 312, R3 is a value stored in the third register 313, R4 is a value stored in the fourth register 314, R5 is a value stored in the fifth register 315, T1 is a first intermediate calculation value, and T2 is a second intermediate calculation value.

Also, ">>1" means right shifting by one bit.

At an initialization step, R1 may be initialized to a dividend, R2 may be initialized to '0', R3 may be initialized to a divisor, R4 may be initialized to a modulus, and R5 may be initialized to a modulus.

Whether R3 is equal to R4 may be determined at step S110. When it is determined at step S110 that R3 is different from R4, whether the lowest significant bit (LSB) of R3 is '0' may be determined at step S120.

When it is determined at step S120 that the LSB of R3 is '0', right shifting of R3 may be performed, and a right-shifted value may be stored in the third register 313 at step S121. Thereafter, whether the LSB of R1 is '0' may be determined at step S122. When it is determined at step S122 that the LSB of R1 is '0', right shifting of R1 may be performed, and a right-shifted value may be stored in the first register 311 at step S123, and thereafter step S110 may be repeated. In contrast, when it is determined at step S122 that the LSB of R1 is not '0', right shifting of (R1+R5) may be performed, and a right-shifted value may be stored in the first register 311 at step S124, and thereafter step S110 may be repeated.

Meanwhile, when it is determined at step S120 that the LSB of R3 is not '0', whether the LSB of R4 is '0' may be determined at step S130.

When it is determined at step S130 that the LSB of R4 is '0', right shifting of R4 may be performed, and a right-shifted value may be stored in the fourth register 314 at step S131. Thereafter, whether the LSB of R2 is '0' may be determined at step S132. When it is determined at step S132 that the LSB of R2 is '0', right shifting of R2 may be performed, and a right-shifted value may be stored in the second register 312 at step S133, and thereafter step S110 may be repeated. In contrast, when it is determined at step S132 that the LSB of R2 is not '0', right shifting of (R2+R5) may be performed, and a right-shifted value may be stored in the second register 312 at step S134, and thereafter step S110 may be repeated.

Meanwhile, when it is determined at step S130 that the LSB of R4 is not '0', whether R3>R4 is satisfied, that is, whether R3 is greater than R4, may be determined at step S140.

When it is determined at step S140 that R3>R4 is satisfied, right shifting of (R3−R4) may be performed, and a right-shifted value may be stored in the third register 313 at step S141.

Thereafter, whether R1 is equal to or greater than R2 may be determined at step S142. When it is determined at step S142 that R1 is equal to or greater than R2, (R1−R2) may be stored as T1 at step S143. In contrast, when it is determined at step S142 that R1 is less than R2, (R1−R2+R5) may be stored as T1 at step S144. Next, whether the LSB of T1 is '0' may be determined at step S145.

When it is determined at step S145 that the LSB of T1 is '0', right shifting of R1 may be performed, and a right-shifted value may be stored in the first register 311 at step S146, and thereafter step S110 may be repeated. In contrast, when it is determined at step S145 that the LSB of T1 is not '0', right shifting of (T1+R5) may be performed, and a right-shifted value may be stored in the first register 311 at step S147, and thereafter step S110 may be repeated.

Meanwhile, when it is determined at step S140 that R3 is not greater than R4, right shifting of (R4−R3) may be performed, and a right-shifted value may be stored in the fourth register 314 at step S151.

Thereafter, whether R2 is equal to or greater than R1 may be determined at step S152. When it is determined at step S152 that R2 is equal to or greater than R1, (R2−R1) may be stored as T2 at step S153. In contrast, when it is determined at step S152 that R2 is less than R1, (R2−R1+R5) may be stored as T2 at step S154. Next, whether the LSB of T2 is '0' may be determined at step S155.

When it is determined at step S155 that the LSB of T2 is '0', right shifting of R2 may be performed, and a right-shifted value may be stored in the second register 312 at step S156, and thereafter step S110 may be repeated. In contrast, when it is determined at step S155 that the LSB of T2 is not '0', right shifting of (T2+R5) may be performed, and a right-shifted value may be stored in the second register 312 at step S157, and thereafter step S110 may be repeated.

The division operation performed by the finite-field division operator 310 according to an embodiment of the present invention may be configured by repeating the addition/subtraction on the values of the registers and right shifting of values.

Figure 5:
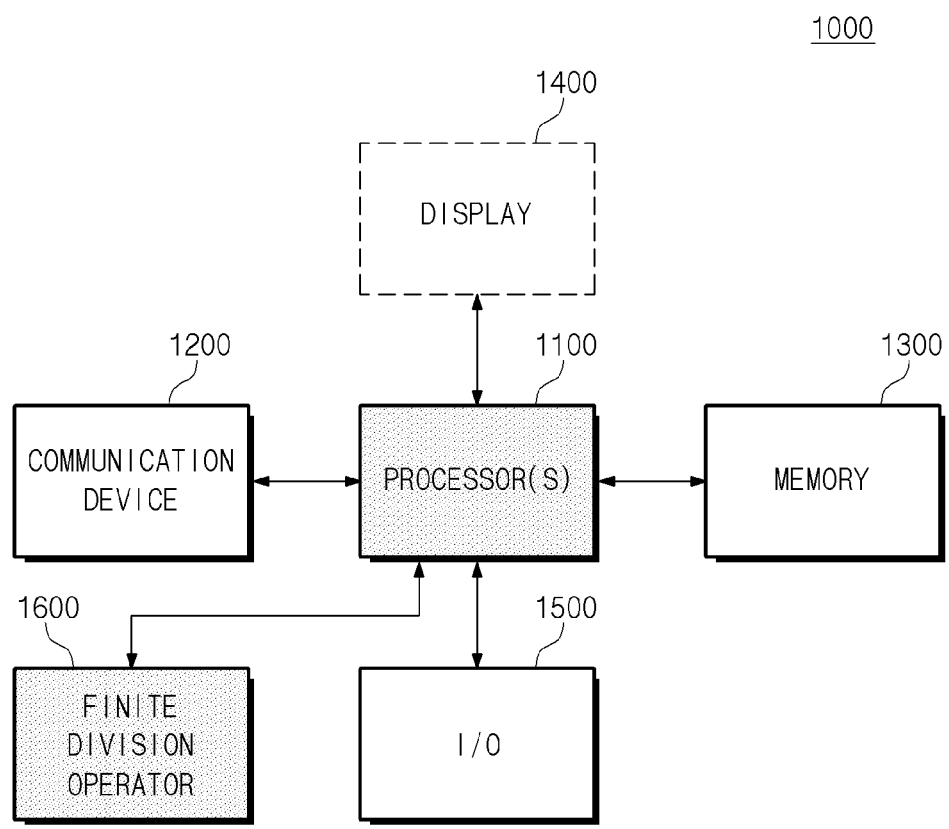
FIG. 5 is a diagram illustrating an electronic device according to an embodiment of the present invention.

FIG. 5 is a diagram exemplarily illustrating an electronic device 1000 according to an embodiment of the present invention. Referring to FIG. 5, the electronic device 1000 may include at least one processor 1100, a network interface (communication device) 1200, memory 1300, a display 1400, an input/output (I/O) device 1500, and a finite-field division operator 1600.

The processor 1100 may include at least one of the devices described above with reference to FIGS. 1 to 4, or may be implemented using at least one of the methods described above with reference to FIGS. 1 to 4. The processor 1100 may be implemented to vary the setup information for the operation devices 200 and 300 (see FIG. 1) or the finite-field division operator 1600 depending on the key length of a cryptographic algorithm, as described above, and to perform elliptic curve encryption/decryption operations based on the varied setup information. Here, the finite-field division operator 1600 may be implemented to be identical to the finite-field division operator 300 of FIG. 3, or may be identically implemented using the finite-field division operation of FIG. 4.

The processor 1100 may execute a program and control an electronic system. The electronic system may be connected to an external device (e.g., a personal computer or a network) through the I/O device 1500, and may exchange data with the external device. The electronic system may include various electronic systems, for example, a mobile device such as a mobile phone, a smart phone, a Personal Digital Assistance (PDA), a tablet computer, or a laptop computer, a computing device such as a personal computer, a tablet computer, or a Netbook, or an electronic appliance such as a television (TV), a smart television, or a security device for gate control.

The network interface 1200 may be implemented to perform communication with an external network in various wired/wireless manners.

The memory 1300 may include computer-readable instructions. The processor 2100 may perform the above-described operations when the instructions stored in the memory 1300 are executed on the processor 1100. The memory 1300 may be volatile memory or nonvolatile memory.

The memory 1300 may include a storage device to store data of a user. The storage device may be an Embedded Multimedia Card (eMMC), a Solid-State Drive (SSD), universal flash storage (UFS), or the like. The storage device may include at least one nonvolatile memory device. The nonvolatile memory device may be any one of NAND flash memory, Vertical NAND (VNAND) flash memory, NOR flash memory, Resistive Random Access Memory (RRAM), Phase-Change Memory (PRAM), Magnetoresistive Random Access Memory (MRAM), Ferroelectric Random Access Memory (FRAM), and Spin Transfer Torque Random Access Memory (STT-RAM).

The above-described embodiments may be implemented using hardware components, software components, and/or combinations of hardware components and software components. For example, the apparatus (device), method, and components described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions. A processing device may execute an Operating System (OS) and one or more software applications running on the OS.

Further, the processing device may access, store, handle, process and generate data in response to the execution of software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors or a single processor and a single controller. Furthermore, the processing device may include an additional processing configuration such as one including parallel processors.

The software may include a computer program, code, an instruction, or a combination of one or more thereof, and may configure the processing device so that the processing device is operated in a desired manner, or may independently or collectively issue commands to the processing device. The software and/or data may be interpreted by the processing device or may be permanently or temporarily embodied in a certain type of machine, a component, a physical device, virtual equipment, a computer-storage medium or device, or a signal wave to be transmitted so as to provide commands or data to the processing device. The software may be distributed to computer systems connected over a network, and may also be stored or executed in a distributed manner. The software and data may be stored in one or more computer-readable storage media.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for embodiments or may be known to and used by those skilled in computer software fields.

Examples of the computer-readable storage medium may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

In accordance with the present invention, there is an advantage in that, when the key length of a cryptographic algorithm is changed, the key length may be updated by adjusting set values without requiring the change in hardware. Therefore, the present invention has an advantage in that costs required for full replacement of hardware in conventional cryptosystems may be reduced. Further, unlike a conventional division operation method configured using software, the present invention is advantageous in that a finite-field division operation, which takes the longest time, is performed using hardware, and thus fast elliptic curve operations may be realized. Therefore, the present invention is advantageous in that, when an elliptic curve cryptographic apparatus and method that can support the update of the key length according to the present invention are used, elliptic curve cryptography may be implemented in fields requiring fast elliptic curve operations, as in the case of a vehicle communication environment, and the update of the key length may be continuously performed in accordance with the change in the key length of the cryptographic algorithm.

The elliptic curve cryptosystem and the method for operating the elliptic curve cryptosystem according to the embodiment of the present invention are configured such that, when the key length of a cryptographic algorithm is changed, the key length may be updated by adjusting set values without requiring the change in hardware, thus reducing costs required for full replacement of hardware in conventional cryptosystems.

Further, the elliptic curve cryptosystem and the method for operating the elliptic curve cryptosystem according to the embodiment of the present invention are configured such that, unlike a conventional division operation method configured using software, a finite-field division operation, which takes the longest time, is performed using hardware, thus enabling fast elliptic curve operations to performed.

Furthermore, the elliptic curve cryptosystem and the method for operating the elliptic curve cryptosystem according to the embodiment of the present invention may support the update of the key length, thus enabling elliptic curve cryptography to be implemented in fields requiring fast elliptic curve operations, as in the case of a vehicle communication environment.

In addition, the elliptic curve cryptosystem and the method for operating the elliptic curve cryptosystem according to the embodiment of the present invention may have the effect of continuously updating the key length in accordance with the change in the key length of the cryptographic algorithm.

Meanwhile, the descriptions of the present invention merely provide detailed embodiments for practicing the invention. The present invention may include not only means that are detailed and actually usable, but also the technical spirit, which is an abstract and conceptual idea that may be available as technology in the future.

What is claimed is:

1. A method for operating an elliptic curve cryptosystem to encrypt and store user data requiring different key lengths, comprising: setting, by a key setting unit, a length of a key of a cryptographic algorithm; generating, by the key setting unit, first setup information that indicates a number of words corresponding to the key length; and generating, by the key setting unit, second setup information that indicates a number of repetitions of an operation by a finite-field division operator corresponding to the key length,
wherein the first setup information is transmitted to a first operation device fully implemented using software comprising a coordinate system transformation unit, an elliptic curve point addition unit, and an elliptic curve scalar multiplication unit, and
the second setup information is transmitted to the finite-field division operator fully implemented using hardware.

2. The method of claim 1, wherein the finite-field division operator comprises: multiple registers, each configured to store an initial value and an intermediate calculation value; multiple adders/subtractors, each configured to perform finite-field addition or subtraction on output values of the multiple registers; multiple multiplexers, each configured to select any one of an output value of any one of the multiple registers and an output value of any one of the multiple adders/subtractors; multiple shifters configured to perform right shifting on output values of the multiple multiplexers and output right-shifted values, which are the intermediate calculation values, to corresponding registers; and a controller configured to control the multiple adders/subtractors, the multiple multiplexers, and the multiple shifters.

3. An elliptic curve cryptosystem to encrypt and store user data requiring different key lengths, comprising: at least one processor; a memory for storing at least one instruction that is executed by the at least one processor; and a finite-field division operator, wherein the at least one instruction is implemented such that: a key setting unit sets a length of a key of a cryptographic algorithm, the key setting unit generates first setup information that indicates a number of words corresponding to the key length, and the key setting unit generates second setup information that indicates a number of repetitions of an operation by a finite-field division operator corresponding to the key length,
wherein the first setup information is transmitted to a first operation device fully implemented using software comprising a coordinate system transformation unit, an elliptic curve point addition unit, and an elliptic curve scalar multiplication unit, and
the second setup information is transmitted to the finite-field division operator fully implemented using hardware.

4. The elliptic curve cryptosystem of claim 3, wherein the at least one instruction is further implemented such that: the coordinate system transformation unit transforms elliptic curve points between an affine coordinate system, a projective coordinate system, and a Jacobian coordinate system so as to perform an elliptic curve cryptographic operation, the elliptic curve point addition unit performs an addition operation on points on two different elliptic curves, and the elliptic curve scalar multiplication unit performs scalar multiplication on an arbitrary point or a fixed point, and wherein the first setup information is transmitted to the coordinate system transformation unit, the elliptic curve point addition unit, and the elliptic curve scalar multiplication unit.

5. The elliptic curve cryptosystem of claim 3, wherein the finite-field division operator comprises: multiple registers, each configured to store an initial value and an intermediate calculation value; multiple adders/subtractors, each configured to perform finite-field addition or subtraction on output values of the multiple registers; multiple multiplexers, each configured to select any one of an output value of any one of the multiple registers and an output value of any one of the multiple adders/subtractors; multiple shifters configured to perform right shifting on output values of the multiple multiplexers and output right-shifted values, which are the intermediate calculation values, to corresponding registers; and a controller configured to control the multiple adders/subtractors, the multiple multiplexers, and the multiple shifters.

6. The elliptic curve cryptosystem of claim 4, wherein the finite-field division operator further comprises: first, second, third, fourth, and fifth registers; a first adder/subtractor configured to perform addition or subtraction on a value stored in the first register, a value stored in the second register, and a value stored in the fifth register; a second adder/subtractor configured to perform addition or subtraction on a value stored in the third register and a value stored in the fourth register; a first multiplexer configured to select any one of the value stored in the first register and an output value of the first adder/subtractor; a second multiplexer configured to select any one of the value stored in the second register and the output value of the first adder/subtractor; a third multiplexer configured to select any one of the value stored in the third register and an output value of the second adder/subtractor; a fourth multiplexer configured to select any one of the value stored in the fourth register and an output value of the second adder/subtractor; first to fourth shifters configured to perform right shifting on respective output values of the first to fourth multiplexers and output right-shifted values to the first to fourth registers, respectively; and a controller configured to control the first and second adder/subtractors, the first to fourth multiplexers, and the first to fourth shifters.

7. The elliptic curve cryptosystem of claim 6, wherein: an initial value of the first register is a dividend, an initial value of the second register is '0', an initial value of the third register is a divisor, an initial value of the fourth register is a modulus, and an initial value of the fifth register is the modulus.

8. The elliptic curve cryptosystem of claim 7, wherein a number of repetitions of an operation performed by each of the first to fifth registers is determined based on the second setup information.

9. The elliptic curve cryptosystem of claim 7, wherein the controller is configured to: when the value stored in the third register is not equal to the value stored in the fourth register, determine whether a Least Significant Bit (LSB) of the value stored in the third register is '0', when the LSB of the value stored in the third register is '0', perform right shifting on the value stored in the third register, and determine whether an LSB of the value stored in the first register is '0', when the LSB of the value stored in the first register is '0', perform right shifting on the value stored in the first register, when the LSB of the value stored in the first register is not '0', perform an addition operation on the value stored in the first register and the value stored in the fifth register, and output a first addition result value, and perform right shifting on the first addition result value, and store a right-shifted first addition result value in the first register.

10. The elliptic curve cryptosystem of claim 9, wherein the controller is configured to: when the LSB of the value stored in the third register is not '0', determine whether an LSB of the value stored in the fourth register is '0', when the LSB of the value stored in the fourth register is '0', perform right shifting on the value stored in the fourth register, and determine whether an LSB of the value stored in the second register is '0', when the LSB of the value stored in the second register is '0', perform right shifting on the value stored in the second register, and when the LSB of the value stored in the second register is not '0', perform an addition operation on the value stored in the second register and the value stored in the fifth register perform and output a second addition result value, and perform right shifting on the second addition result value, and store a right-shifted second addition result value in the second register.

11. The elliptic curve cryptosystem of claim 10, wherein the controller is configured to: when the LSB of the value stored in the fourth register is not '0', determine whether the value stored in the third register is greater than the value stored in the fourth register, when the value stored in the third register is greater than the value stored in the fourth register, subtract the value stored in the fourth register from the value stored in the third register and output a first subtraction result value, perform right shifting on the first subtraction result value, store a right-shifted first subtraction result value in the third register, and determine whether the value stored in the first register is equal to or greater than the value stored in the second register, when the value stored in the first register is equal to or greater than the value stored in the second register, set a value, obtained by subtracting the value stored in the second register from the value stored in the first register, as a first intermediate calculation value, when the value stored in the first register is less than the value stored in the second register, subtract the value stored in the second register from the value stored in the first register, set a value, obtained by adding the value stored in the fifth register to a subtraction result value, as the first intermediate calculation value, and determine whether an LSB of the first intermediate calculation value is '0', when the LSB of the first intermediate calculation value is '0', perform right shifting on the value stored in the first register, and when the LSB of the first intermediate calculation value is not '0', add the value stored in the fifth register to the first intermediate calculation value and output a third addition result value, perform right shifting on the third addition result value, and store a right-shifted third addition result value in the first register.

12. The elliptic curve cryptosystem of claim 11, wherein the controller is configured to: when the value stored in the third register is not greater than the value stored in the fourth register, subtract the value stored in the third register from the value stored in the fourth register and output a second subtraction result value, perform right shifting on the second subtraction result value, store a right-shifted second subtraction result value in the fourth register, and determine whether the value stored in the second register is equal to or greater than the value stored in the first register, when the value stored in the second register is equal to or greater than the value stored in the first register, set a value, obtained by subtracting the value stored in the first register from the value stored in the second register, as a second intermediate calculation value, when the value stored in the second register is less than the value stored in the first register, subtract the value stored in the first register from the value stored in the second register, set a value, obtained by adding the value stored in the fifth register to a subtraction result value, as the second intermediate calculation value, and determine whether an LSB of the second intermediate calculation value is '0', when the LSB of the second intermediate calculation value is '0', perform right shifting on the value stored in the second register, and when the LSB of the second intermediate calculation value is not '0', add the value stored in the fifth register to the second intermediate calculation value and output a fourth addition result value, perform right shifting on the fourth addition result value, and store a right-shifted fourth addition result value in the second register.

13. The elliptic curve cryptosystem of claim 7, wherein the controller is configured to, when the value stored in the third register is equal to the value stored in the fourth register, terminate a finite-field division operation.

* * * * *